United States Patent [19]

Yamazaki et al.

[11] 4,404,944
[45] Sep. 20, 1983

[54] FUEL SUPPLY SYSTEM FOR AN INJECTION-TYPE INTERNAL COMBUSTION ENGINE

[75] Inventors: Masafumi Yamazaki, Yokohama; Mikio Suzuki, Zushi, both of Japan

[73] Assignee: Nissan Motor Co., Ltd., Yokohama, Japan

[21] Appl. No.: 290,078

[22] Filed: Aug. 4, 1981

[30] Foreign Application Priority Data

Aug. 7, 1980 [JP] Japan ............................ 55-111163[U]
Aug. 15, 1980 [JP] Japan ............................ 55-115662[U]
Sep. 10, 1980 [JP] Japan ................................ 55-124700

[51] Int. Cl.³ ........................ F02D 5/02; F02M 51/00
[52] U.S. Cl. ................................ 123/458; 123/179 L; 123/463; 123/512
[58] Field of Search ............... 123/457, 458, 459, 461, 123/463, 464, 478, 510, 512, 516, 179 L, 491, 511

[56] References Cited

U.S. PATENT DOCUMENTS 2,599,699  6/1952  Dilworth et al. .
2,988,077  6/1961  Hottenroth ........................ 123/459
3,416,504  12/1968 Jackson ........................ 123/461 X
3,730,159  5/1973  Sallot ............................ 123/457 X
3,949,714  4/1976  Mitchell .............................. 123/458
4,167,169  9/1979  White ................................. 123/458
4,184,465  1/1980  Nakazeki et al. ................... 123/463

FOREIGN PATENT DOCUMENTS 2352964  10/1973  Fed. Rep. of Germany .
2432693  7/1974   Fed. Rep. of Germany .
2719749  7/1978   Fed. Rep. of Germany .
55-91761  7/1980  Japan .................................. 123/457
470580   8/1968   Switzerland .
1355921  6/1974   United Kingdom .
1537053  12/1978  United Kingdom .

Primary Examiner—Tony M. Argenbright
Attorney, Agent, or Firm—Schwartz, Jeffery, Schwaab, Mack, Blumenthal & Koch

[57] ABSTRACT

A fuel supply system for an injection-type internal combustion engine using a gasoline or alcohol blended gasoline as a fuel. In addition to a conventional fuel supply system there is provided a fuel temperature detector which detects and signals the fuel temperature increases and exceeds a predetermined value and a fuel pressure regulating means responsive to the fuel temperature detector for raising the fuel pressure within the fuel supply line applied to each fuel injector above a constant value regulated according to the pressure difference between the fuel pressure within the fuel supply line and the intake manifold vacuum pressure so as to prevent the fuel supply line from being clogged due to the occurrence of vapor lock at the time when the engine is started at a high fuel temperature or when the engine runs at a low speed under a high fuel temperature.

13 Claims, 18 Drawing Figures

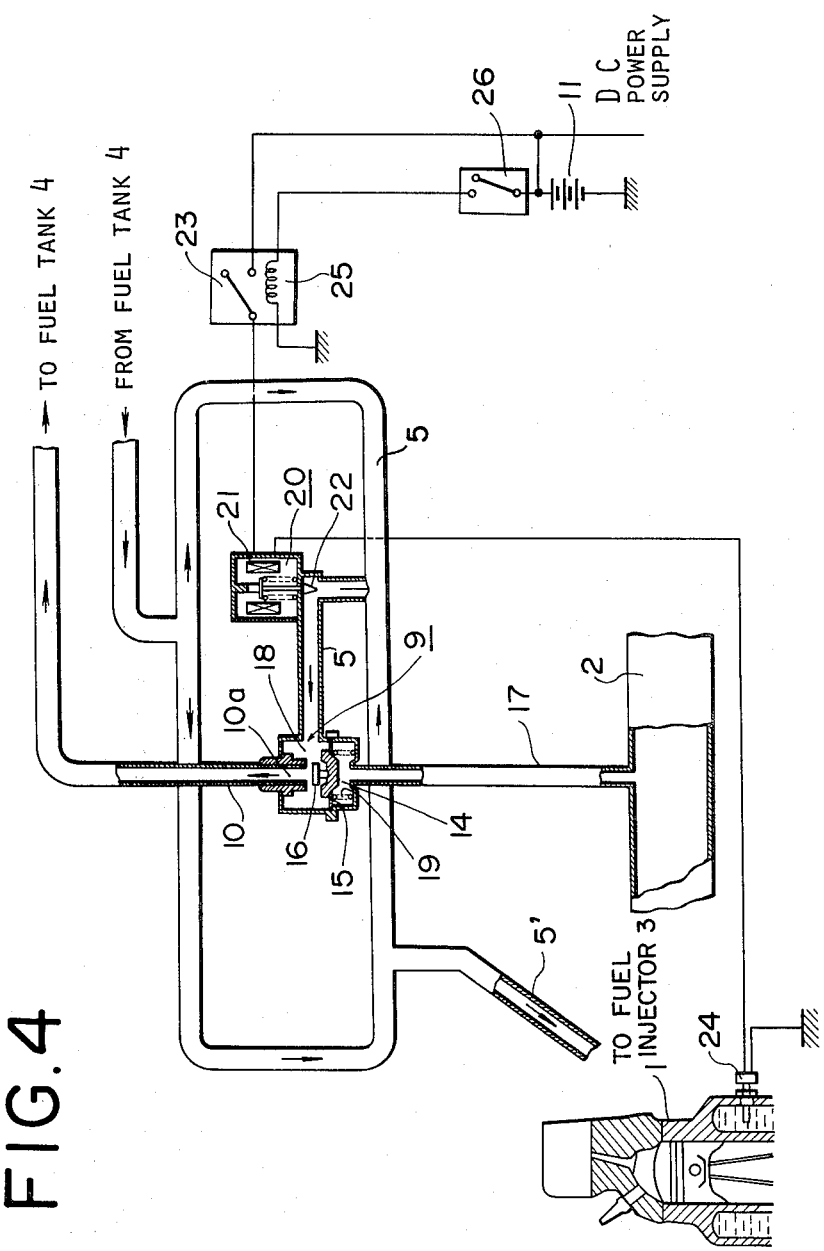

FUEL SUPPLY SYSTEM FOR AN INJECTION-TYPE INTERNAL COMBUSTION ENGINE

BACKGROUND OF THE INVENTION

1. Field of the Invention

The present invention relates to a fuel supply system for an injection-type internal combustion engine which raises a pressure of fuel applied to each fuel injector above a regulated pressure value so that the engine can be smoothly operated without occurrence of a vapor lock at the time of high fuel temperature.

2. Statement of the Prior Art

A conventional fuel supply system for an injection-type internal combustion engine comprises:

(1) a fuel tank;
(2) a fuel injector located at an intake port of intake manifold of each engine cylinder;
(3) a fuel pump located at a fuel supply line between the fuel tank and the fuel injector for applying a pressure to the fuel fed from the fuel pump;
(4) a fuel damper located at the fuel supply line from the fuel pump;
(5) a fuel filter located at the fuel supply line from the fuel damper; and
(6) a fuel pressure regulator which regulates the pressure of fuel to be supplied to each injector so that the difference between the fuel pressure and a vacuum pressure within the intake manifold indicates a constant value (e.g., approximately 2.55 kg/cm$^2$) and returns an extra amount of fuel into the fuel tank via a fuel return line; and
(7) a fuel injection control unit which outputs a pulse signal into an electromagnetic valve of each fuel injector, the duty ratio of the pulse signal being based on various engine operating parameter signals such as an intake air flow rate signal, an engine revolutional speed signal, and so on, so that the fuel injector injects an optimum amount of fuel into the corresponding cylinder according to the engine operating condition.

There is a problem in such a conventional fuel supply system, however, in that since the whole fuel supply system is disposed within the engine room, the fuel is heated, and particularly the fuel temperature at the fuel supply line in the vicinity of the engine body may be raised excessively so that a vapor lock of fuel occurs. This problem is especially serious when gasoline blended with alcohol is used as the fuel. Among other things in a fuel comprising of gasoline blended with 10% ethanol, a limit temperature at which the vapor lock occurs is reduced by 15° C. or 16° C. when compared to gasoline only fuel.

Therefore, in the case where the temperature within the engine compartment is raised when the engine is restarted minutes after the engine is stopped or during engine running at a low speed, the fuel injection control unit and fuel injectors may not operate correctly due to the clogging of the fuel supply line caused by vapor lock.

SUMMARY OF THE INVENTION

With the above-described problem in mind, it is a primary object of the present invention to provide a fuel supply system for an injection-type internal combustion engine wherein there is provided a means for detecting a fuel temperature within a fuel supply line (for detecting whether the fuel temperature increases and exceeds a predetermined value) and a means for raising the fuel pressure within the fuel supply line by interrupting the return of extra amounts of fuel within the fuel supply line feeding the fuel tank in response to the fuel temperature detecting means when the fuel temperature exceeds the predetermined value, whereby the engine runs smoothly without occurrence of vapor lock which would clog the fuel supply line linked with each fuel injector.

It is another object of the present invention to provide a fuel supply system for an injection-type internal combustion engine wherein there is provided a fuel injection control unit which outputs a pulse signal whose pulse width determining the valve opening time of each fuel injector is corrected to become narrower in response to the fuel pressure raising means, whereby each fuel injector injects an appropriate amount of fuel into the corresponding cylinder when the fuel pressure applied to the fuel injector is raised.

BRIEF DESCRIPTION OF THE DRAWINGS

The features and advantages of the fuel supply system for an internal combustion engine according to the present invention will be better appreciated from the following description taken in conjunction with the accompanying drawings in which like reference numerals designate corresponding elements, and in which:

FIG. 4 shows a first preferred embodiment of a fuel supply system for an injection-type internal combustion engine according to the present invention;

DESCRIPTION OF THE PREFERRED EMBODIMENTS

Figure 1:
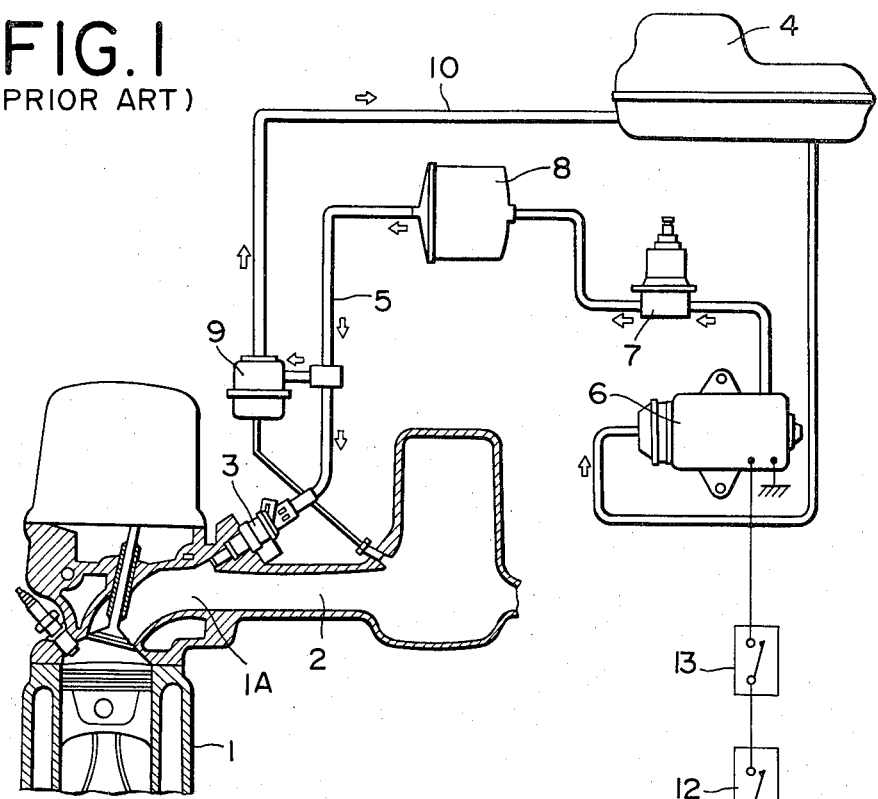
FIG. 1 shows a conventional fuel supply system for an injection-type internal combustion enigne.

Reference is made to FIG. 1 which shows a conventional fuel supply system for an injection-type internal combustion engine.

In FIG. 1, numeral 1 denotes an engine body, numeral 2 denotes an intake manifold, numeral 3 denotes a fuel injector located at an intake port 1A of the intake manifold 2, the number of the fuel injectors corresponding to that of cylinders, and numeral 4 denotes a fuel tank. Within the fuel supply line 5 for connecting the fuel injector 3 with the fuel tank 4, a fuel pump 6, a fuel damper 7, filter 8, and pressure regulator 9 are provided. The fuel pressurized by means of the fuel pump 6 is supplied to the fuel injector, and the pressure difference between the intake manifold vacuum pressure and fuel pressure is controlled at a constant value (e.g., about 2.5 kg/cm$^2$) by the fuel pressure regulator 9.

An extra amount of fuel discharge from the pressure regulator 9 due to its pressure regulating action is returned to the fuel tank 4 via a fuel return line 10. A fuel injection control unit (not shown in FIG. 1) sends a pulse signal into each fuel injector 3 whose pulse width is calculated on a basis of various engine operating parameter signals, e.g., representing an intake air flow rate (Q), the number of engine revolutions per time (N), and engine cooling water temperature, etc. The fuel injector 3 is provided with an electromagnetic coil which turns on to open a needle valve so that a certain amount of fuel is injected depending on the valve opening time, i.e., the pulse width. Numeral 11 denotes a DC power supply such as a battery, numeral 12 denotes an ignition switch, and numeral 13 denotes an intake air flow sensor switch. The intake air flow sensor switch 13 is closed when the engine 1 starts air intake action.

In such a conventional fuel supply system, the supplied fuel may be heated excessively since the whole fuel supply system is mounted within the engine compartment room. Particularly, the fuel temperature of the fuel supply line 5 in the vicinity of engine body 1 may be raised to a considerably high temperature so that vapor lock may easily occur.

Figure 3:
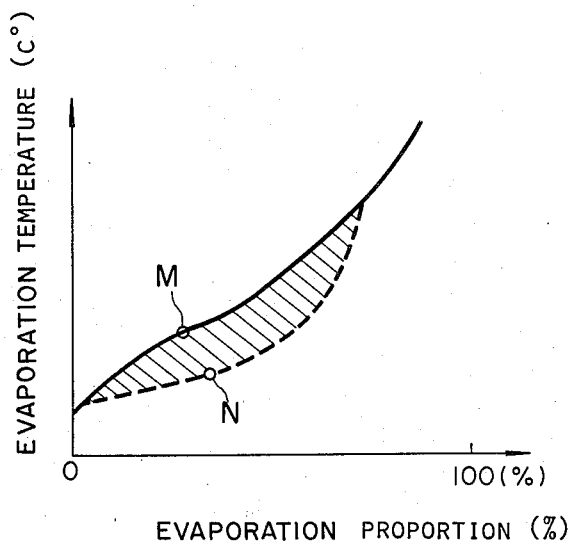
FIG. 3 shows a graph representing distillation characteristics of gasoline or alcohol blended gasoline used for the engine fuel.

Furthermore, in a case where gasoline or alcohol blended gasoline is used as the engine fuel, the distillation characteristic of the fuel indicates a considerably low evaporation temperature as shown in FIG. 3. Particularly, the evaporation temperature of the alcohol blended gasoline fuel (N) is lower than that of the gasoline fuel (M). Therefore, vapor pressure becomes higher under high temperature conditions so that vapor lock is more readily developed, and thus the engine restarting performance is diminished. About three to five minutes after the time when the engine is stopped after running at high speed, the heat generated from the engine body and engine exhaust system raises the temperature of the fuel supply system. In this state, if one tries to restart the engine, the vapor lock phenomenon often occurs in the fuel of the fuel supply line, thus remarkably deteriorating the restarting performance of the engine.

The fuel supply system linked with a plurality of fuel injectors is generally provided with the fuel pressure regulator 9 as shown in FIG. 1. Since the pressure regulator 9, however, serves as maintaining the pressure difference between the intake manifold vacuum pressure and fuel pressure constant at all times regardless of whether the engine is restarted at a high fuel temperature, and controls the fuel pressure irrespective of the occurrence of the vapor lock phenomenon, the fuel supply to each fuel injector 3 cannot be controlled sufficiently, and thus the engine can not be smoothly restarted.

Figure 2:
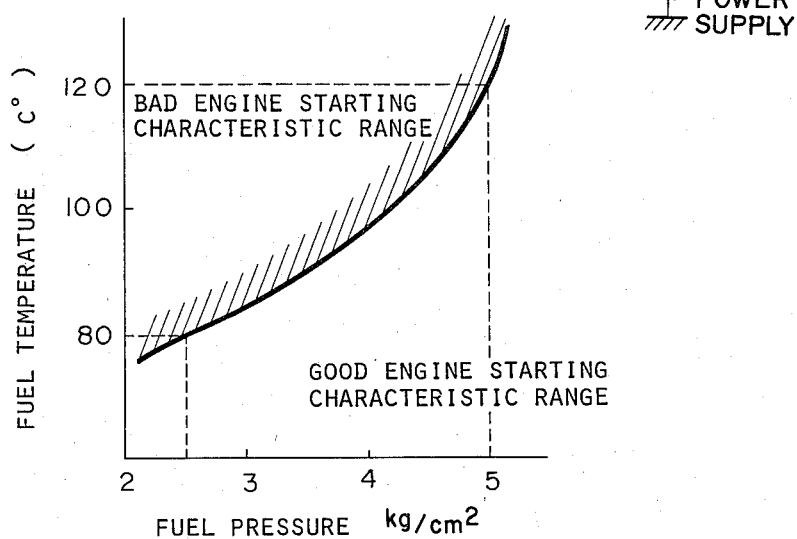
FIG. 2 shows a graph representing an engine starting performance from the relationship between the fuel pressure and fuel temperature.

FIG. 2 shows the experimental result of the restarting performance of the engine at high temperatures in the relationship between the fuel temperature and the fuel pressure. It will be seen that when the fuel pressure indicates approximately 2.5 kg/cm$^2$, the engine is not easily restarted when the fuel temperature exceeds approximately 80° C.

FIG. 4 shows a fuel supply system for an internal combustion engine of a first preferred embodiment according to the present invention.

In FIG. 4, the pressure regulator 9 has a vacuum pressure chamber 14, located at one side of the diaphragm 15 on which a valve body 16 is mounted and connected to an intake manifold 2 via a vacuum pressure guide 17. The other side of the diaphragm 15 is provided with a fuel chamber 18 into which the opening end 10a of the fuel return line 10 is inserted. The valve body 16 is biased at all times so as to close the opening end 10a by means of an elastic force of a coil spring 19. Hence, the sides of the diaphragm 15 are exposed to the fuel pressure within the fuel supply line 5 and intake manifold vacuum pressure, and any non-balance against the elastic force of the coil spring 19 causes the opening end 10a of the fuel return line 10 to be either opened or closed. Closing the opening end 10a causes the fuel pressure within the fuel supply line 5 to rise and, on the other hand, opening the opening end 10a causes the fuel pressure of the fuel supply line 5 to fall so that the pressure difference between the intake manifold vacuum pressure and fuel pressure within the fuel supply line 5 is regularly controlled.

An electromagnetic opening valve 20 provided upstream of the pressure regulator 9 in a branch of the fuel supply line 5 moves a valve body 22 so as to close the branch of the fuel supply line 5 when an electromagnetic coil 21 is energized. The electromagnetic coil 21 is inserted within a series circuit comprising the DC power supply 11, a relay switch 23, and an engine cooling water temperature sensor 24 which turns on when the cooling water temperature rises and exceeds a predetermined value at which the vapor lock occurs. An electromagnetic coil 25 of the relay switch 23, a start switch 26 which turns on when the engine starts cranking, and the DC power supply 11 constitute another series circuit. The relay switch 23 is, thus, turned on at the time of engine cranking.

When the start switch 26 is turned on to start the engine 1, the coil 25 of the relay switch 23 is energized so that the relay contact 23 is turned on. At this time, if the fuel supply system is likely to develop vapor lock because the engine compartment is exposed to a high temperatures due to the heated engine, e.g., about three to five minutes after the time when the engine is stopped after high speed running, the cooling water temperature sensor 24 detects that the engine cooling water temperature exceeds the predetermined value and turns on. Consequently, the electromagnetic coil 21 of the electromagnetic opening valve 20 is energized so that the valve body 22 closes the branch of the fuel supply line 5.

Therefore, if the fuel supply line 5 is clogged due to the vapor lock of fuel at the time of engine restarting with high fuel temperature, the fuel is forcefully supplied into the fuel injector 3 without interruption so that the engine can surely be restarted.

It should be noted that when the fuel pressure within the fuel supply line 5 is abnormally raised above a predetermined value (e.g., above 3.6 kg/cm$^2$ ), a relief valve (not shown) provided within the fuel pump 6 causes the flow of fuel to reverse to return the fuel tank 4 so that possible damage of the fuel supply system due to excessive rise in the fuel pressure is prevented. Such relief valve may be provided within the fuel supply system independently of the fuel pump 6.

In addition, since the start switch 26 is turned off after the engine has started the relay switch 23 is turned off so that the valve body 22 of the electromagnetic opening valve 20 is lifted upward to open the branch of the fuel supply line 5 and then the fuel return line 10. Consequently, the pressure regulator 9 returns to its normal functioning state.

Figure 5:
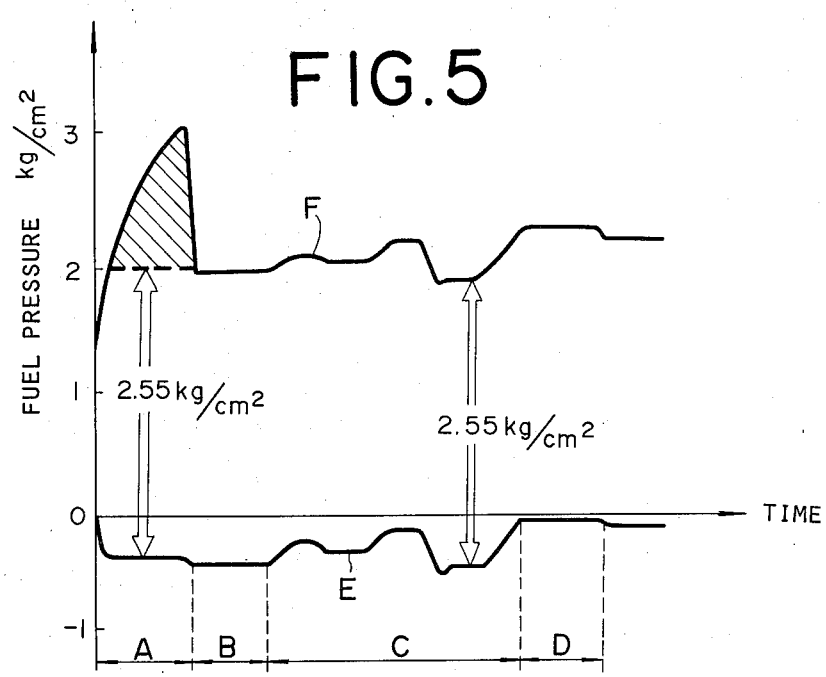
FIG. 5 shows a graph representing a fuel pressure controlling characteristic of the fuel supply system of the first preferred embodiment according to the present invention.

FIG. 5 shows a characteristic of such fuel pressure control of the first preferred embodiment as described above. As shown in FIG. 5, if the temperature of the fuel supply line 5 is high enough to develop vapor lock develops at the time of engine cranking A, the higher fuel pressure is maintained as shown in the hatched portion of FIG. 5 than the conventional fuel pressure control. At the time of subsequent idling state B, partial loading state C, and a throttle valve full open state D, the pressure regulator 9 controls the fuel pressure (F) so that the pressure difference between the fuel pressure (F) and intake manifold vacuum pressure (E) indicates a predetermined value (e.g., 2.55 kg/cm$^2$).

Figure 6:
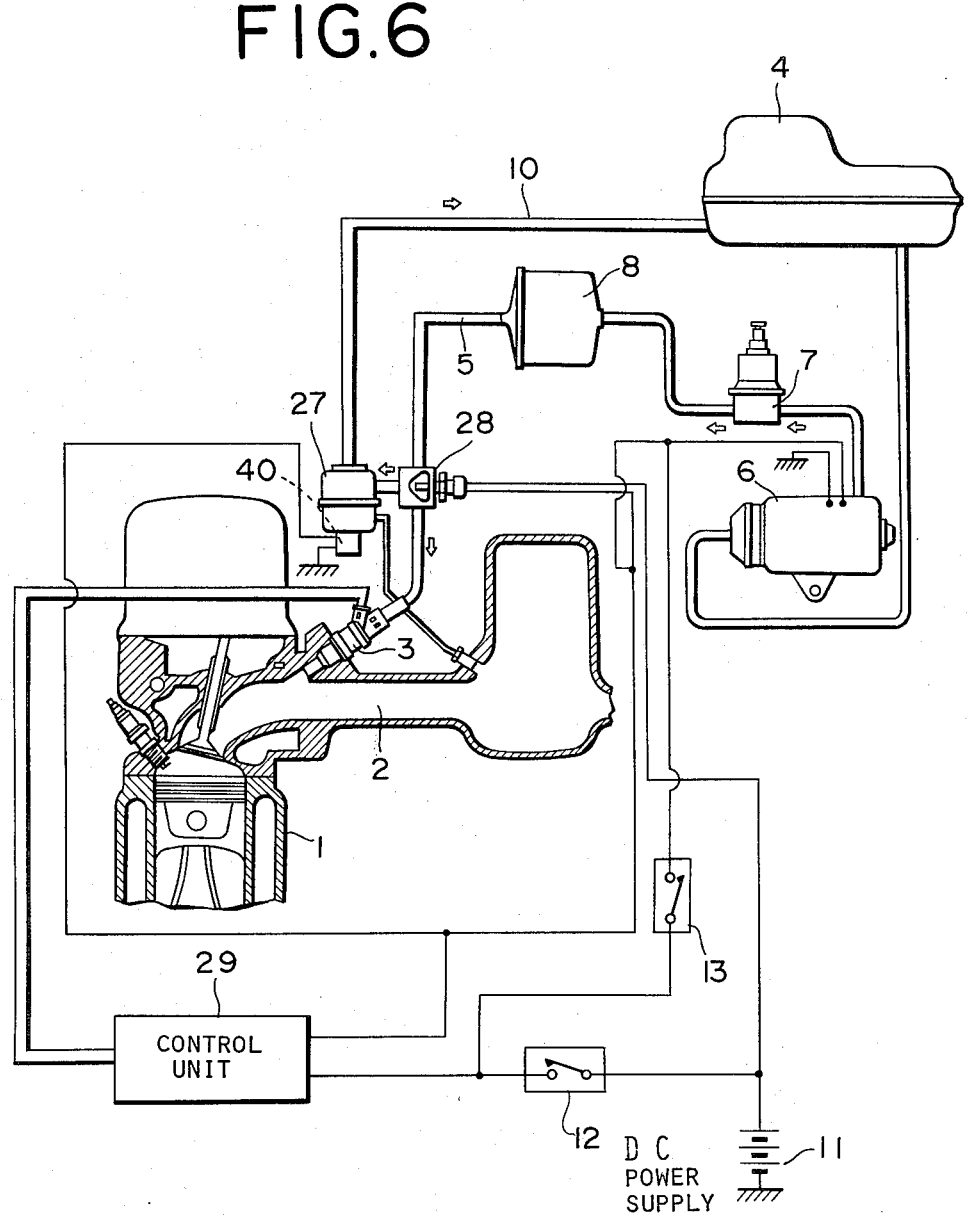
FIG. 6 shows a second preferred embodiment of a fuel supply system for the internal combustion engine according to the present invention.

FIG. 6 shows a fuel supply system of the second preferred embodiment according to the present invention.

Figure 7:
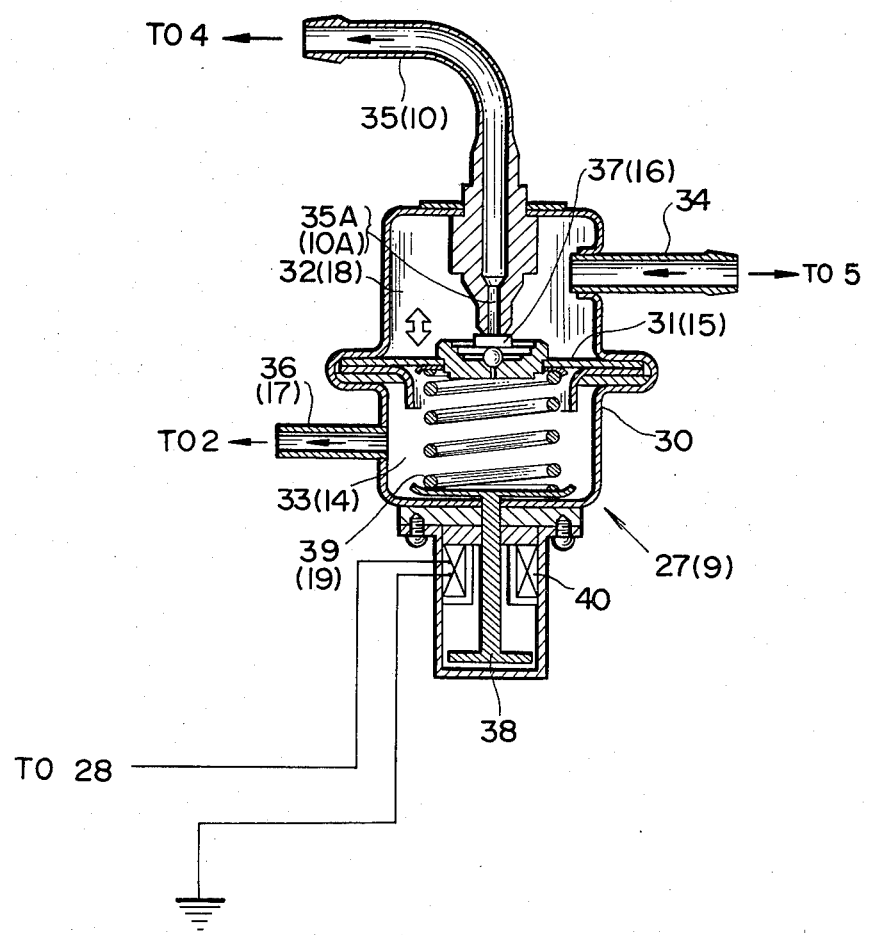
FIG. 7 shows an internal configuration of a fuel pressure regulating means used in the second preferred embodiment of the fuel supply system of an internal combustion engine.

In FIG. 6, numeral 28 denotes a fuel temperature detecting means which directly detects the fuel temperature and numeral 27 denotes a fuel pressure regulating means which raises the fuel pressure when the fuel temperature exceeds a predetermined value in response to the fuel temperature detecting means 28. Numeral 29 denotes a fuel injection control circuit. The fuel pressure regulating means 27, as shown in FIG. 7, has a construction comprising a tubular body 30 defined by a fuel chamber 32 and vacuum pressure chamber 33 via a diaphragm 31. The fuel chamber 32 is connected to the branch of the fuel supply line 5 via a fuel inlet tube 34 and with a fuel exit tube 35 via an opening end 35A. A vacuum pressure guide 36 is connected to the intake manifold 2. The diaphragm 31 is provided with a disc-shaped valve body 37 facing the fuel chamber 32. The valve body 37 is positioned at the opening end 35A of the fuel exit tube 35 so as to face the opening end 35A. A slidable push rod 38 is mounted within the vacuum pressure chamber 33 facing the diaphragm 31. The valve body 37 is in contact with the opening end 35A biased by the spring force of a coil spring 39 positioned between the push rod 38 and diaphragm 31. An electromagnetic coil 40 is provided around the push rod 38 so that the push rod 38 is pulled upward in FIG. 7 to contract the coil spring 39 so as to increase a set load (fuel relief pressure). The action of such fuel pressure regulating means 27 is basically the same as the conventional pressure regulator 9 shown in FIGS. 1 and 4. The numerals in the brackets shown in FIG. 7 correspond to those of the pressure regulator 9 shown in FIG. 4 because of their basically similar structure and functions. In more detail, when the pressure difference between the fuel pressure acting on the fuel chamber 32 (the pressure to be applied to each fuel injector 3) and intake manifold pressure acting on the vacuum pressure chamber 33 exceeds the set load of the coil spring 39, the diaphragm 31 is pushed to open the opening end 35A so that the extra fuel within the fuel supply line 5 is delivered to the fuel return line 10. Consequently, the pressure difference between the fuel pressure and the intake manifold vacuum pressure is maintained constant. In such regulating means 27, the push rod 38 is pulled upward to increase the set load of the coil spring 39 when the coil 40 is energized as described above. For example, whereas the relief pressure indicates about 2.5 kg/cm$^2$ in a state shown in FIG. 7 (normal state), the relief pressure may be increased to about 5 kg/cm$^2$. The energization of the fuel pressure regulating means 27 (electromagnetic coil 40) is dependent upon the fuel temperature detecting means 28. The fuel temperature detecting means 28 is a kind of temperature sensor or temperature sensitive switch. In the condition where the fuel temperature at the fuel supply line 5 exceeds a predetermined value, the fuel temperature detecting means 28 remains closed, the DC voltage is always applied to both the fuel pump 6 and the fuel pressure regulating means 27 regardless of whether the ignition switch 12 is turned on or off as seen from FIG. 6.

Figure 8A:
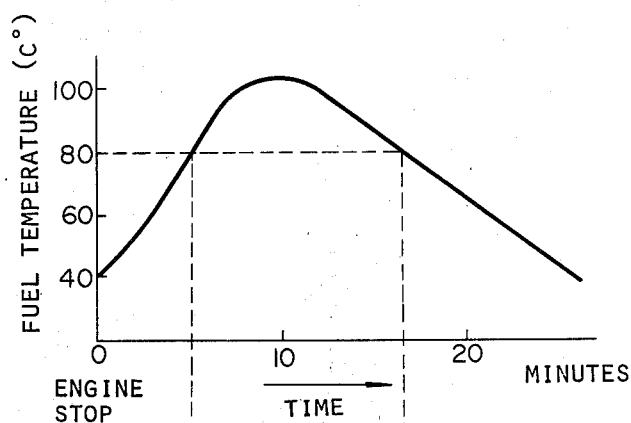
FIGS. 8(A), 8(B) and 8(C) show an action of the second preferred embodiment of the fuel supply system according to the present invention in the case when the engine fuel temperature is abruptly raised after the engine has stopped.
Figure 8B:
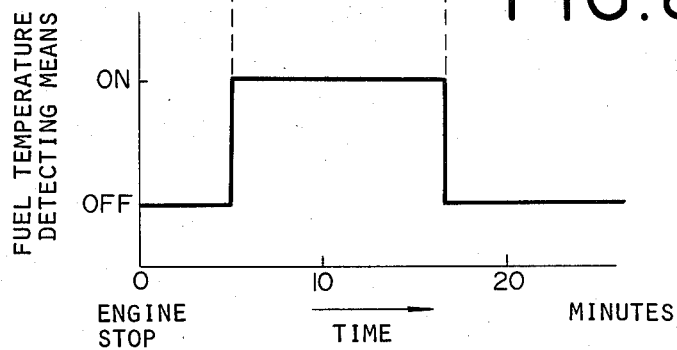
Figure 8C:
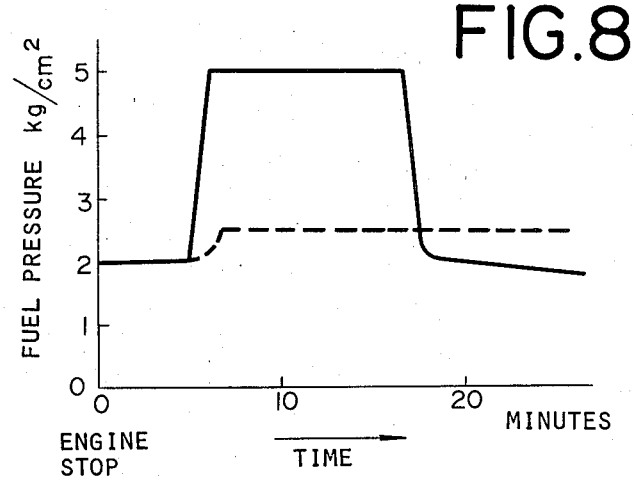

FIGS. 8(A), 8(B) and 8(C) show an action of the second preferred embodiment based on the construction described above in a state where the engine compartment temperature is raised excessively after the engine stops. Since the outside wind flowing through the engine compartment during vehicle running is not circulated within the engine compartment when the engine stops, the engine compartment temperature is raised abruptly so that the fuel temperature increases accordingly as shown in FIG. 8(A). At this time, when the fuel temperature increases and exceeds a predetermined value (in this embodiment, about 80° C.), the fuel temperature detecting means 28 turns on as shown in FIG. 8(B) so that the DC voltage of the DC power supply 11 is applied to the fuel pump 6 and fuel pressure regulating means 27. Hence, the fuel pressure within the fuel supply passage 5 is raised by means of the fuel pump 6 and the pressure regulating means 27 as shown by a solid line in FIG. 8(C).

Consequently, the vapor lock phenomenon can be avoided within the fuel supply line 5.

In addition, since the fuel injection is not carried out when the engine is off relatively low temperature fuel is circulated within the fuel supply line 5 because of the relief function of the pressure regulating means 27 and thus, the fuel temperature within the fuel supply line 5 is reduced speedily. When the fuel temperature is reduced below the predetermined value, the fuel temperature detecting means 28 turns off to interrupt the DC voltage to both the fuel pump 6 and the fuel pressure regulating means 27. As a result, the fuel pressure returns to the original value. In FIG. 8(C), a dotted line denotes the fuel pressure change of the conventional fuel supply system. In this case shown by the dotted line, when the fuel pressure immediately after the engine stops (in this case, about 2 kg/cm$^2$) is raised due to the vapor lock above a constant value (about 2.5 kg/cm$^2$), the conventional pressure regulator 9 starts the relief action towards the fuel pressure of about 2.5 kg/cm², so that vapor lock cannot be avoided and the fuel cannot be circulated sufficiently. Therefore, the fuel temperature does not reduce rapidly.

While in the second preferred embodiment, the action described above is made even at the time of engine running so that engine stall due to the vapor lock of fuel at the time of low speed vehicle running can be avoided.

On the other hand, the amount of fuel injection per time is increased due to the raised fuel pressure at the time of engine running. To cope with this problem, in this preferred embodiment, the pulse width (duty ratio) of the control pulse signal fed into each fuel injector 3 is narrowed (reduced) so that each fuel injector injects an appropriate amount of fuel.

Figure 9:
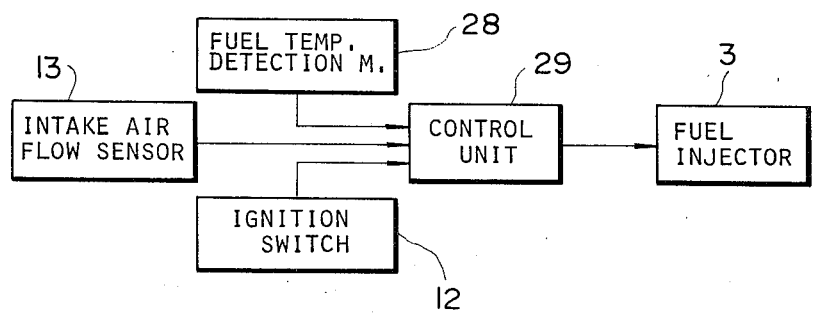
FIG. 9 shows a block diagram of the second preferred embodiment of the fuel supply system for correcting a pulse width of a pulse signal to be sent into an electromagnetic coil of each fuel injector which opens a needle valve when energized.
Figure 10:
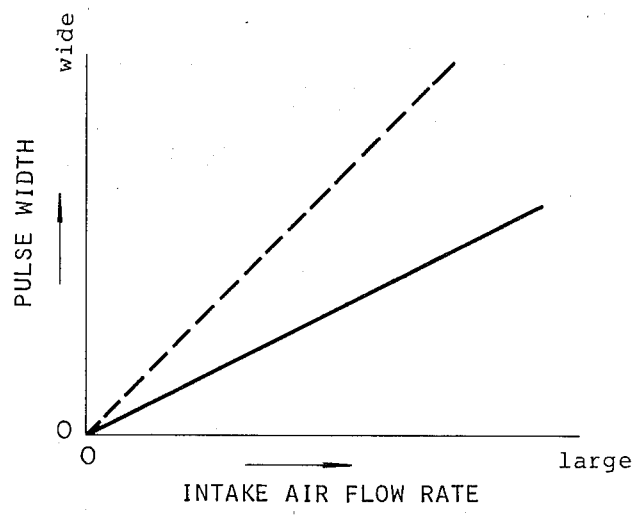
FIG. 10 shows a graph representing the relationship between the intake air flow rate and pulse width in the second preferred embodiment.

In detail, the control unit 29, as shown in FIG. 9, starts a given operation depending on whether the intake air amount sensor (Q) switch 13 is turned on with the ignition switch 12 turned on and then sends a control pulse signal into each fuel injector 3. It should be noted that an amount of injected fuel per time depends on the pulse width (duty ratio) of the outputted pulse signal provided that the pressure difference between the fuel pressure applied to each fuel injector and the manifold vacuum pressure is constant. At this time, the control unit 29 selects one of two different control-characteristic modes as shown in FIG. 10. In FIG. 10, a dotted line denotes the control characteristic line (the fuel temperature below 80° C.) in the normal mode and a solid line denotes the control characteristic line (the fuel temperature above 80° C.) in the mode of high fuel pressure. When the fuel temperature detecting means 28 is turned on, each fuel injector 3 is driven in the characteristic mode shown by the solid line of FIG. 10 which indicates that the pulse width is narrow compared with the characteristic mode shown by the dotted line because of the raised fuel pressure applied to each fuel injector.

Consequently, an appropriate amount of fuel can be supplied within each cylinder even at the time of high fuel pressure in the same manner as at the time of normal fuel pressure.

In the second preferred embodiment described above, the fuel temperature detecting means 28 is installed in a midway of the fuel supply line 5 so as to detect the fuel temperature directly. Alternatively, the fuel temperature may be detected indirectly from the engine cooling water temperature or from the engine compartment air temperature, etc.

Figure 11:
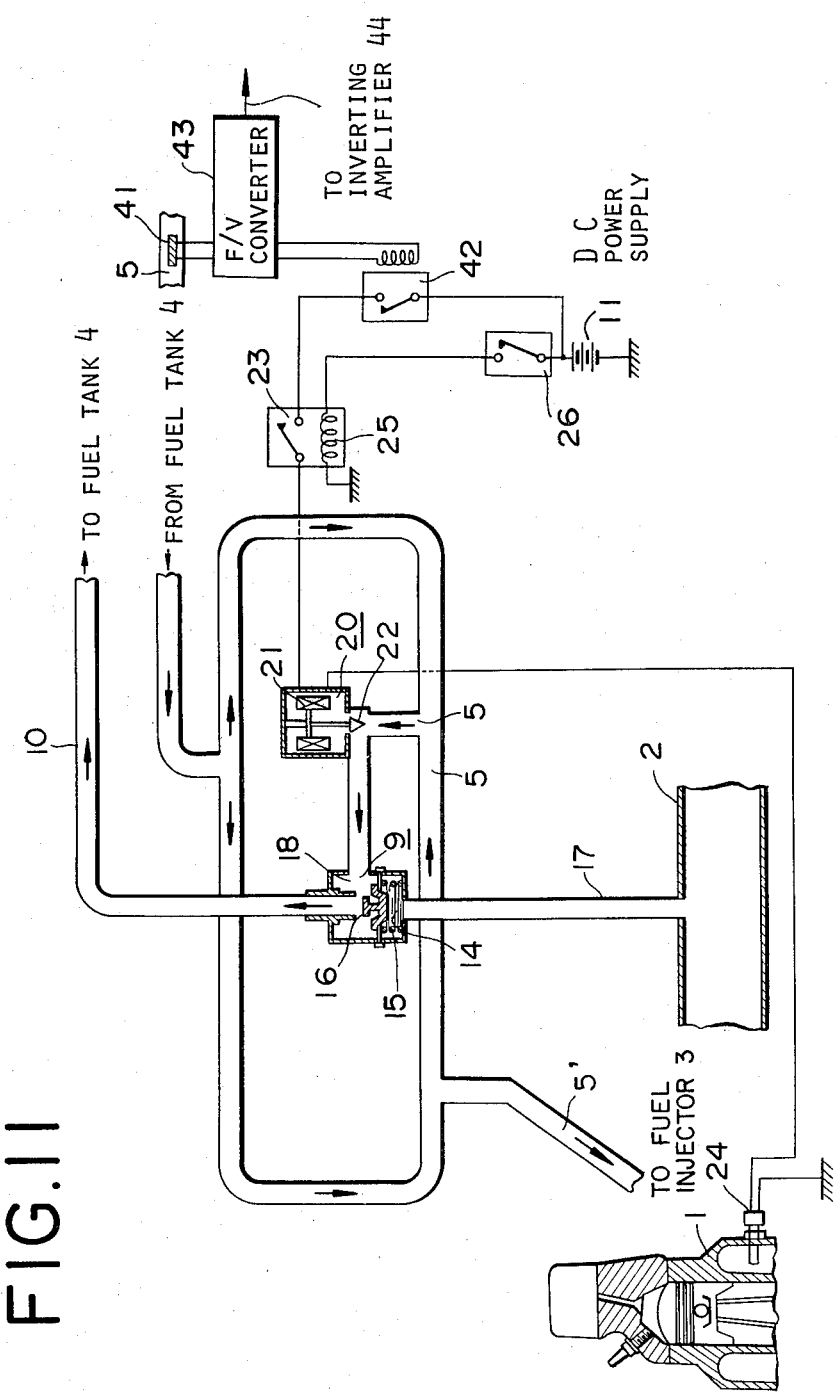
FIG. 11 shows a third preferred embodiment of the fuel supply system according to the present invention.

FIG. 11 shows an internal combustion engine of a fuel injection type and a fuel supply system of a third preferred embodiment according to the present invention.

In the third preferred embodiment shown in FIG. 11, the electromagnetic opening valve 20 is installed upstream of the fuel pressure regulator 9 in the branch of the fuel supply line 5 in the same way as in the first preferred embodiment, and a sensor 41 for detecting the concentration of alcohol to gasoline (hereinafter referred simply to as an alcohol sensor) is installed in the fuel supply line 5. The Figure also shows the engine cooling water temperature sensor 24, the electromagnetic coil 21 of the electromagnetic opening valve 20, the relay contact 23 which turns on when the electromagnetic coil 25 is energized via the engine start switch 26, and another relay 42 whose electromagnetic coil is connected to the alcohol sensor 41 via frequency-to-voltage converter 43 (hereinafter referred simply to as F/V converter). The alcohol sensor 41 is, e.g., of an electrostatic capacity type wherein a capacitor is immersed in the fuel so as to detect the difference of dielectric constant between gasoline and alcohol or alternatively of a type wherein the concentration of alcohol is detected from the change in a conductivity of the fuel between a pair of electrodes.

Figure 13A:
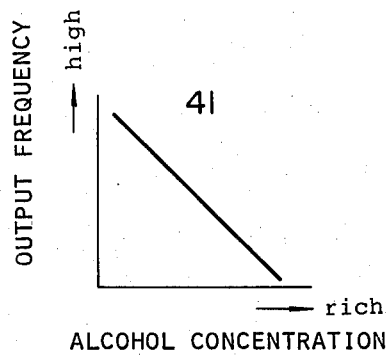
FIGS. 13(A) through 13(D) show an output characteristic of each block shown in FIG. 12.
Figure 13B:
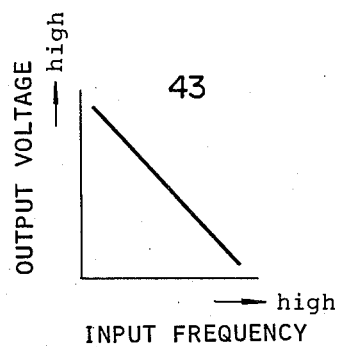
Figure 13C:
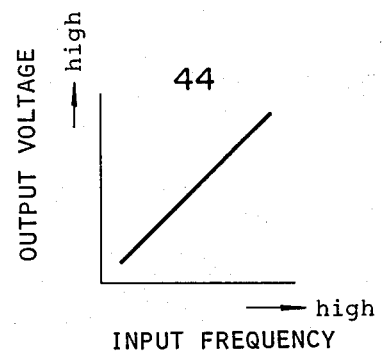
Figure 13D:
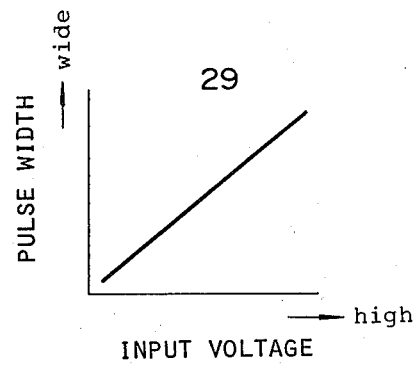

The output frequency of the alcohol sensor 41, as shown in FIG. 13(A) according to the capacitance variation of the capacitor is converted into a voltage inversely proportional to the output frequency of the alcohol sensor 41 by means of the F/V converter 44 as shown in FIG. 13(B). An electromagnetic coil of the relay 42 is energized by a current flowing therethrough from the F/V converter 43 and the contact thereof is turned on only when the alcohol sensor 41 detects that the concentration of alcohol exceeds a predetermined value. The engine start switch 26 is turned on to energize the coil 25 of the relay 23 when the ignition switch is set at the engine start position to drive an engine start motor (not shown). The engine cooling water temperature sensor 24 turns on only when the engine temperature detected via the cooling water temperature indicates a value above a predetermined value.

When the engine start switch 26 is turned on to start the engine 1, the relay 23 is closed. At this time, when the engine temperature exceeds a predetermined value (i.g., the engine starting at a high engine temperature), the cooling water temperature sensor 24 is also turned on. In addition, when the alcohol concentration in the fuel of the fuel supply line 5 is high, i.e., the volatility of the fuel is increased, the voltage outputted from the F/V converter 43 increases, and the relay 42 is turned on. Consequently, the electromagnetic opening valve 20 is energized to close the fuel return line 10 so that the fuel pressure within the fuel supply line 5 increases.

Therefore, since the fuel supplied from the fuel pump 6 is forcefully sent into each fuel injector 3 even if the fuel supply line 5 and branch line 5' linked with each fuel injector 3 is clogged due to the vaporization of fuel, the fuel supply system according to the present invention can assure the smooth engine starting at a high fuel temperature in spite of the occurrence of vapor lock.

Figure 12:
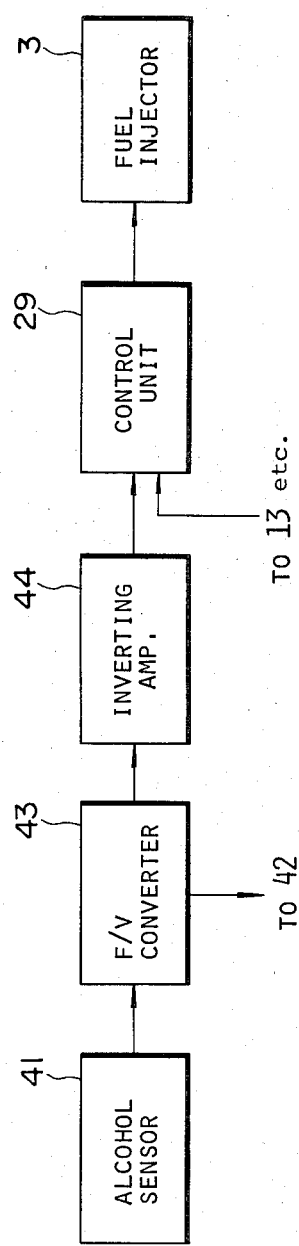
FIG. 12 shows a block diagram relating to a fuel injection control unit of the third preferred embodiment according to the present invention.

A relief valve may be provided within the fuel pump 6 so as to prevent the fuel leakage and damage at the joints of the fuel supply line 5. After the engine starts, the start switch 26 is turned off so that the electromagnetic opening valve 20 cannot receive the DC voltage and thus the fuel pressure raising action is released. Hence, while the fuel pressure is raised irrespective of the intake manifold vacuum pressure, the pressure regulator 9 regulates the fuel pressure in response to the intake manifold vacuum pressure after the engine has started. After the engine has started, the electromagnetic opening valve 20 is opened so that the fuel pressure drops. At this time, since the fuel from the fuel tank 4 of relatively low fuel temperature is supplied within the fuel supply line 5, the vapor lock of fuel cannot take place. Furthermore, in order to provide an appropriate amount of fuel for each engine cylinder via the corresponding fuel injector, the fuel supply system of the third preferred embodiment corrects the pulse width of the control signal fed to each fuel injector 3 since the amount of injected fuel per time increases by an amount corresponding to the raised fuel pressure at the time of engine start. The output voltage of the F/V converter 43 is also fed into the control unit 29 via an inverting amplifier 44 as shown in FIG. 12 which generates and outputs a pulse signal whose pulse width is obtained on a basis of an output voltage from the air flow meter, etc. The pulse width of the pulse signal from the control unit 29 is proportional to the input voltage from the air flow meter (not shown) provided within the throttle chamber of the engine 1. The output voltage of the inverting amplifier 44 for the control unit 29 makes it possible to change the pulse width (duty ratio) of the output pulse signal of the control unit 29, and it becomes narrower as shown in FIGS. 13(A) through 13(D) depending on the concentration of alcohol to gasoline.

According to the present invention, there is provided a fuel pressure regulating means and fuel temperature detecting means within a fuel supply line of a conventional fuel supply control system for an injection-type internal combustion engine using gasoline or alcohol blended gasoline as a fuel so that when the engine is started at a high fuel temperature, the fuel pressure applied to each fuel injector is increased above a normal value until the fuel temperature decreases below a predetermined value to maintain a good engine starting characteristic.

In addition, during the time when the fuel pressure is increased above the normal value, the valve opening time of each fuel injector is adjusted to inject an appropriate amount of fuel into the corresponding cylinder. Therefore, the accuracy of each fuel injector needs not to be increased and an extra load is not applied to the fuel pump, so that the pressure regulating means and fuel temperature detecting means can easily be applied to the conventional fuel supply system.

It will be fully understood by those skilled in the art that the foregoing description is in terms of preferred embodiments of the present invention wherein various changes and modifications may be made without departing from the spirit and scope of the present invention, which is to be defined by the appended claims.

What is claimed is:

1. A fuel supply system for an internal combustion engine using a gasoline or alcohol blended gasoline as a fuel, comprising:
   (a) a fuel tank;
   (b) a fuel injector which injects the fuel to the engine;
   (c) a fuel supply line which connects said fuel injector with said fuel tank;
   (d) a fuel pump disposed in said fuel supply line;
   (e) a fuel return line connected with said fuel supply line beteen said fuel pump and fuel injector, for returning an amount of fuel to upstream of said fuel pump;
   (f) a fuel pressure regulator disposed between said fuel supply line and fuel return line for regulating the amount of returned fuel and a fuel pressure in said fuel supply line between said fuel pump and fuel injector;
   (g) temperature sensor means for generating a signal when the temperature of the fuel in said fuel supply line is above a predetermined value; and
   (h) means for restricting the amount of returned fuel and for raising the fuel pressure in response to the signal outputted from said temperature sensor means.

2. A fuel supply system for an internal combustion engine as set forth in claim 1, further comprising a switch, said switch outputting a signal when an engine starter motor is on, and wherein said restricting means operates in response to both signals of said temperature sensor means and said switch.

3. A fuel supply system for an internal combustion engine as set forth in claim 2, further comprising a concentration sensor which detects whether a concentration of alcohol in the fuel is above a predetermined value and outputs a signal, wherein said restricting means operates in response to the signals of said temperature sensor means, said switch, and said concentration sensor.

4. A fuel supply system for an internal combustion engine as set forth in claim 1 wherein said restricting and raising means comprises a fuel pressure regulator and said fuel pump, and said fuel pump and fuel pressure regulator each operate in response to the signal outputted from said temperature sensor means.

5. A fuel supply system for an internal combustion engine as set forth in any one of claim 1-4 inclusive, wherein said restricting and raising means comprises an electromagnetic valve which operatively closes said fuel return line so as to raise the fuel pressure within said fuel supply line in response to the signal from said temperature sensor means.

6. A fuel supply system for an internal combustion engine as set forth in any one of claims 1 to 4 inclusive, wherein said means for restricting and raising comprises a fuel pressure regulator which includes a diaphragm, a valve which is mounted on said diaphragm and which opens and closes said fuel return line, a spring which urges said valve to be closed against said fuel pressure, and means for increasing an urging force of said spring.

7. A fuel supply system for an internal combustion engine as set forth in claim 5, wherein said temperature sensor means is a sensor which detects whether an engine coolant water temperature exceeds a predetermined value so as to indirectly detect said fuel temperature in said fuel supply line.

8. A fuel supply system for an internal combustion engine as set forth in claim 6, wherein said temperature sensor means is a sensor which detects whether an engine coolant water temperature exceeds a predetermined value so as to indirectly detect said fuel temperature in said fuel supply line.

9. A fuel supply system for an internal combustion engine as set forth in claim 5, wherein said temperature sensor means is a sensor located within said fuel supply line which directly detects said temperature of the fuel in said fuel supply line.

10. A fuel supply system for an internal combustion engine as set forth in claim 6, wherein said temperature sensor means is a sensor located within said fuel supply line which directly detects said temperature of said fuel.

11. A fuel supply system for an internal combustion engine as set forth in claims 2 or 3 further comprising a means for appropriately reducing a pulse width of an electric signal applied to said fuel injector in response to the operation of said restricting and raising means.

12. A fuel supply system as set forth in claim 3, wherein said alcohol concentration sensor detects the concentration of alcohol within the fuel from the change of electrostatic capacity of a capacitor immersed into said fuel supply line on a basis of the difference of permittivity between gasoline and alcohol.

13. A fuel supply system for an internal combustion engine as set forth in any one of claims 1 to 4 inclusive, wherein said restricting and raising means comprises a fuel pressure regulator which includes a diaphragm by which a chamber of said fuel pressure regulator is divided into two small chambers, a first smaller chamber linked with said fuel supply line and a second smaller chamber linked with an engine intake manifold, and a valve body located within said first chamber and positioned between said diaphragm and an opening end linked with said fuel return line, said valve body operative to open and close said opening end according to the movement of said diaphragm, said diaphragm moving said valve body to close or open said opening end so as to maintain a constant pressure difference between the fuel in said fuel supply line and vacuum in an intake manifold of said engine, and wherein said fuel restricting and raising means further comprises a spring located within said fuel pressure regulator so as to urge said valve body to close said opening end, an electromagnet, and a push rod, located in contact with said spring and within said electromagnet, which increases the urging force of said spring so as to push said spring to close said opening end via said diaphragm and valve body when said electromagnet is energized in response to the signal received from said temperature sensor means.

* * * * *